(12) United States Patent
Venkatesan

(10) Patent No.: US 10,652,277 B1
(45) Date of Patent: May 12, 2020

(54) IDENTIFYING AND BLOCKING OVERLAY PHISHING

(71) Applicant: CA, Inc., San Jose, CA (US)

(72) Inventor: Dinesh Venkatesan, Chennai (IN)

(73) Assignee: CA, Inc., San Jose, CA (US)

( * ) Notice: Subject to any disclaimer, the term of this patent is extended or adjusted under 35 U.S.C. 154(b) by 176 days.

(21) Appl. No.: 15/721,281

(22) Filed: Sep. 29, 2017

(51) Int. Cl.
*H04L 29/06* (2006.01)
*G06F 17/22* (2006.01)

(52) U.S. Cl.
CPC ...... *H04L 63/1483* (2013.01); *G06F 17/2247* (2013.01); *H04L 63/1425* (2013.01)

(58) Field of Classification Search
CPC ............. H04L 63/1483; H04L 63/1425; G06F 17/2247
USPC .......................................................... 726/23
See application file for complete search history.

(56) References Cited

U.S. PATENT DOCUMENTS

| 8,341,774 B1* | 1/2013 | Norris ...................... A47K 3/34 4/557 |
| 2016/0036834 A1* | 2/2016 | Filatov ................ H04L 63/1408 726/22 |
| 2019/0028497 A1* | 1/2019 | Karabchevsky .... H04L 63/1425 |

\* cited by examiner

*Primary Examiner* — Michael S McNally
(74) *Attorney, Agent, or Firm* — Maschoff Brennan

(57) ABSTRACT

A method to block overlay phishing attempt is described. In one embodiment, the method includes detecting a first application displaying a page of the first application on a display of a computing device, detecting a second application displaying a page of the second application on the display of the computing device, upon detecting the second application displaying the page of the second application, comparing a schematic representation of the page of the first application to a schematic representation of the page of the second application, and determining whether an overlay phishing attempt occurs based at least in part on the comparing.

20 Claims, 8 Drawing Sheets

IDENTIFYING AND BLOCKING OVERLAY PHISHING

BACKGROUND

The use of computer systems and computer-related technologies continues to increase at a rapid pace. This increased use of computer systems has influenced the advances made to computer-related technologies. Computer systems have increasingly become an integral part of the business world and the activities of individual consumers. Computer systems may be used to carry out several business, industry, and academic endeavors. As technology in the home, work place, and public areas continues to develop, the ability to secure and protect user information has become more difficult.

SUMMARY

According to at least one embodiment, a method to block overlay phishing attempt is described. In some cases, the present systems and methods may be performed by a computing device comprising one or more processors. In some cases, the present systems and methods may leverage heuristics to determine overlay phishing attempt in a computing device. In one embodiment, the method may include detecting, via the computing device, a first application displaying a page of the first application on a display of the computing device, detecting, via the computing device, a second application displaying a page of the second application on the display of the computing device, upon detecting the second application displaying the page of the second application comparing, via the computing device, a schematic representation of the page of the first application to a schematic representation of the page of the second application, and determining, via the computing device, whether an overlay phishing attempt occurs based at least in part on the comparing.

In some embodiments, the method may include retrieving one or more details associated with the first application and the second application, and comparing the author of the first application to the author of the second application. In some cases, the one or more details comprises at least an author associated with the first application and an author associated with the second application.

In some embodiments, the method may include detecting the overlay phishing attempt by the second application based at least in part on determining that the schematic representation of the page of the first application and the schematic representation of the page of the second application match, and the author of the first application does not match the author of the second application.

In some embodiments, the method may include measuring a time between the first application initially displaying the page of the first application on the display and the second application displaying the page of the second application over the first application, and determining whether the measured time satisfies a predetermined time threshold.

In some embodiments, the method may include detecting the overlay phishing attempt based at least in part on determining the measured time satisfies the predetermined time threshold, and permitting the second application to continue to display the page of the second application upon determining the measured time fails to satisfy the predetermined time threshold.

In some cases, the method may include permitting the second application to continue to display the page of the second application upon determining the schematic representation of the page of the first application does not match the schematic representation of the page of the second application or upon determining the author of the first application does match the author of the second application, or both.

In some embodiments, the method may include determining that the first application is pushed to background and the second application is fetched to foreground. In some cases, the second application is fetched to foreground within a predetermined time threshold after the first application is pushed to background.

In some embodiments, the schematic representation of the page of the first application is a first wireframe of the page of the first application and the schematic representation of the page of the second application is a second wireframe of the page of the second application. In some cases, the first wireframe or the second wireframe, or both, comprises at least one of: a number of buttons, a location of at least one button on the page of the first application and/or the second application, a number of text fields, a location of at least one text field on the page of the first application and/or the page of the second application, a number of labels, a location of at least one label on the page of the first application and/or the page of the second application, a number of icons, a location of at least one icon on the page of the first application and/or the page of the second application, or any combination thereof.

In some embodiments, the method may include determining a sensitivity level associated with the displayed page of the first application, determining that the sensitivity level satisfies a predetermined threshold, and detecting the overlay phishing attempt by the second application based at least in part on determining that the schematic representation of the page of the first application and the schematic representation of the page of the second application match, and the sensitivity level satisfying the predetermined threshold.

In some embodiments, the method may include performing a security action based at least in part on detecting the overlay phishing attempt by the second application. In some cases, the method may include blocking a display of the second application by pushing the second application to background and fetching a warning message to foreground.

A computing device configured for blocking overlay phishing attempt is also described. The computing device may include one or more processors and memory in electronic communication with the one or more processors. The memory may store computer executable instructions that when executed by the one or more processors cause the one or more processors to perform the steps of detecting a first application displaying a page of the first application on a display of the computing device, detecting a second application displaying a page of the second application on the display of the computing device, upon detecting the second application displaying the page of the second application, comparing a schematic representation of the page of the first application to a schematic representation of the page of the second application, and determining whether an overlay phishing attempt occurs based at least in part on the comparing.

In some embodiments, the one or more processors may perform the steps of retrieving one or more details associated with the first application and the second application, and comparing the author of the first application to the author of the second application. In some cases, the one or more details comprises at least an author associated with the first application and an author associated with the second application.

In some embodiments, the one or more processors may perform the steps of detecting the overlay phishing attempt by the second application based at least in part on determining that the schematic representation of the page of the first application and the schematic representation of the page of the second application match, and the author of the first application does not match the author of the second application.

In some embodiments, the one or more processors may perform the steps of measuring a time between the first application initially displaying the page of the first application on the display and the second application displaying the page of the second application over the first application, and determining whether the measured time satisfies a predetermined time threshold.

In some embodiments, the one or more processors may perform the steps of detecting the overlay phishing attempt based at least in part on determining the measured time satisfies the predetermined time threshold, and permitting the second application to continue to display the page of the second application upon determining the measured time fails to satisfy the predetermined time threshold.

A non-transitory computer-readable storage medium storing computer executable instructions is also described. When the instructions are executed by one or more processors, the execution of the instructions may cause the one or more processors to perform the steps of displaying a page of the first application on a display of the computing device, detecting a second application displaying a page of the second application on the display of the computing device, upon detecting the second application displaying the page of the second application, comparing a schematic representation of the page of the first application to a schematic representation of the page of the second application, and determining whether an overlay phishing attempt occurs based at least in part on the comparing.

In some embodiments, the execution of the instructions may cause the one or more processors to perform the steps of retrieving one or more details associated with the first application and the second application, and comparing the author of the first application to the author of the second application. In some cases; the one or more details comprises at least an author associated with the first application and an author associated with the second application.

In some embodiments, the execution of the instructions may cause the one or more processors to perform the steps of detecting the overlay phishing attempt by the second application based at least in part on determining that the schematic representation of the page of the first application and the schematic representation of the page of the second application match, and the author of the first application does not match the author of the second application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
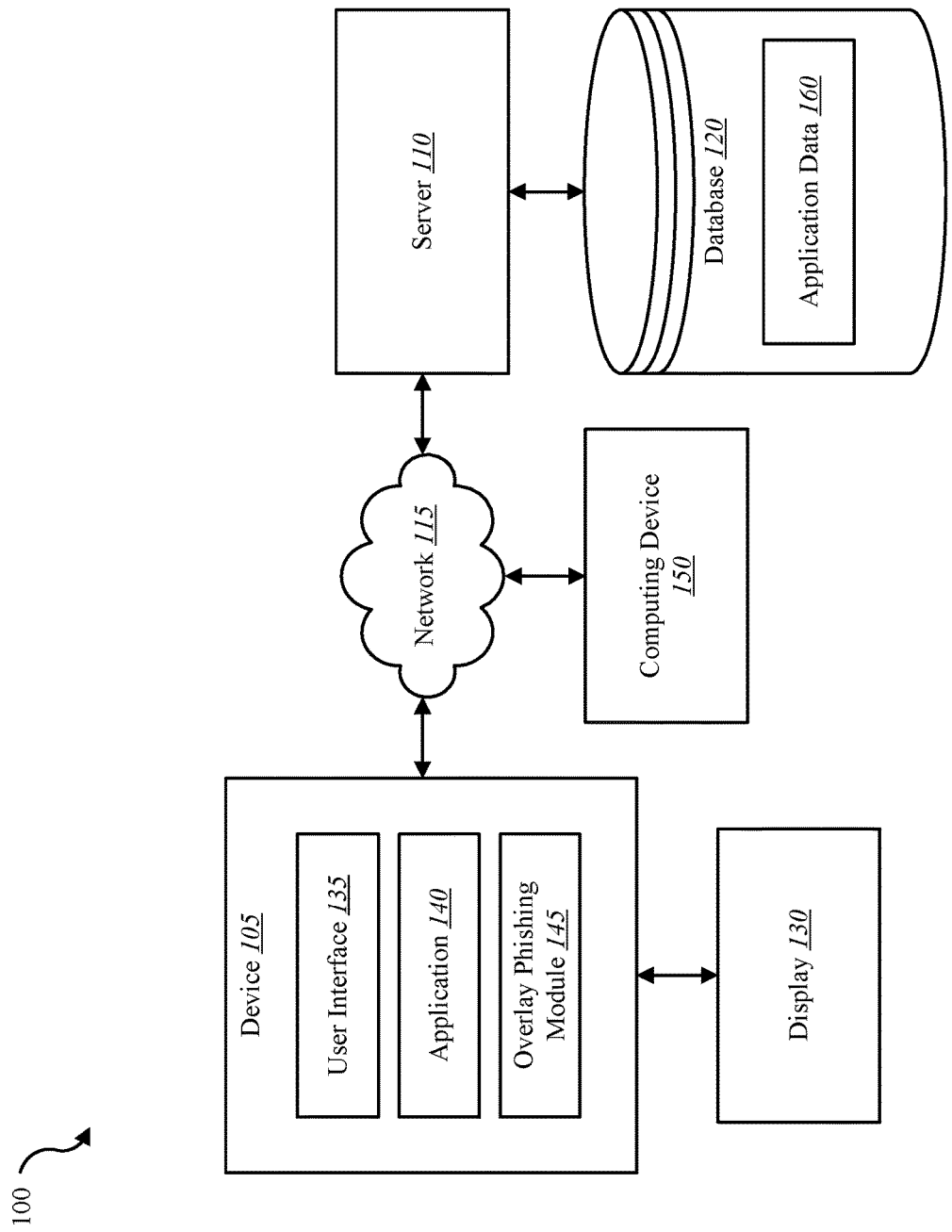
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather; the instant disclosure covers all modifications; equivalents; and alternatives falling within the scope of the appended claims.

DETAILED DESCRIPTION OF EXEMPLARY EMBODIMENTS

The systems and methods described herein relate to detecting overlay phishing attempts. More specifically, the systems and methods described herein relate to detecting a phishing attempt by an application by displaying a page over another application. In particular, certain types of electronic communications are subject to phishing attacks that may impersonate a trustworthy website or application, gather and/or receive information relating to the website or application, and engage in harmful, hostile behavior to steal information. One example of this attack is using overlay phishing malwares that often directs users to enter personal information in a page that looks to identical to a legitimate website. Users of technology may be unaware of these attacks and as a result may unknowingly divulge secure information to those breaching the system. Thus, there exists needs in the art to develop systems and methods blocking block overlay phishing attempts.

Phishing is a term used to define an attempt to obtain sensitive information such as usernames, passwords, and credit card details, often for malicious reasons, by disguising as a trustworthy entity in an electronic communication. Overlay phishing may be performed by constructing application pages such that they appear as if they are part of a legitimate application. Overlay phishing is one of the primary threats for financial applications. Overlay phishing malware usually masquerades as a legitimate financial application such as a banking application and tricks a user to install it. Once the user unknowingly installs an overlay phishing malware or if the malware is downloaded on a computing device, then the malware runs in the background and monitors all applications that are being executed on the computing device. The overlay phishing malware usually attempts overlay phishing if the user is executing a sensitive application (such as a banking application). In some cases, the overlay phishing malware usually attempts overlay phishing if the user is executing a sensitive page of an application (such as a page for accepting payments in an online shopping application).

Upon determining that a sensitive application is being executed on the computing device, the overlay phishing malware pulls a page of the legitimate application to the background and brings its own page to the foreground. The overlay phishing malware generates the page as a replica of the page of the legitimate application. In this manner, the overlay phishing malware tricks a user into using the page displayed by the malware instead of the page displayed by the legitimate application. In some cases, the switch between the page displayed by the legitimate application and the page displayed by the overlay phishing malware usually takes place in nanoseconds. If the user is not able to identify the switch, then they may provide the overlay phishing malware with sensitive information (such as financially sensitive information). This information may then get exfiltrated to a malicious server.

The present systems and methods describes a solution that can automatically identify an overlay phishing attempt using heuristic behaviors without any hardcoded signatures. The systems and methods monitor applications accessed by a user on a computing device, and it creates a schematic representation of each application.

In one embodiment, the present systems and methods may monitor currently running applications in one or more different methods. In one embodiment, the present systems and methods may use a getRunningTask( ) application programming interface (API) to monitor currently running applications. In some cases, the present systems and methods may monitor one or more file system folders of a mobile operating system to monitor currently running applications. Additionally or alternatively, the present systems and methods may monitor one or more accessibility APIs of a mobile operating system to monitor currently running applications. In some cases, the present systems and methods may monitor only predetermined applications installed on a particular mobile device. Upon detecting a first application being pushed to the background (e.g., the first application being one of the predetermined applications) and a UI of a second application other than the first application being brought to the foreground, the present systems and methods may analyze the components of the second application. In some cases, the present systems and methods may analyze for the phish activity programmatically to identify potential phishing activity and block access to the second application.

In some cases, the systems and methods may create a schematic representation of each page of an application. The schematic representation may be a wireframe version of an application or a page of an application. For example, the resent systems and methods determines a number buttons, a number of text fields, a number of labels, and a number of icons present on a screen of the current running application. The systems and methods may then determine whether another application supersedes a screen of a previous application. Upon determining that a second application supersedes a particular screen displayed by a first application, the present systems and methods may compare wireframes associated with each application. If both wireframes look exactly same, then the present systems and methods may be configured to check whether both applications are signed by the same author or a different author. If the applications are signed by different authors, then the present systems and methods may be configured to notify that there is an attempt for overlay phishing. The notification may include alerting the user and blocking the page displayed by the second application from coming to the foreground. In some cases, upon detecting the presence of the overlay phishing malware, the present systems and methods may provide the user a one-click uninstallation option for the overlay phishing malware.

Benefits of the present systems and methods include detecting phishing malware using a heuristic system. The present systems and methods are configured to run without any signatures and therefore they have better performance than signature-based systems.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, a display 130, a computing device 150, and a network 115 that allows the device 105, the server 110, and the computing device 150 to communicate with one another.

Examples of the device 105 may include any combination of networking devices, mobile devices, smart phones, personal computing devices, computers, laptops, desktops, servers, media content set top boxes, or any combination thereof. Further examples of device 105 may include at least one of a network router, a wired router; a wireless router, network interface controller; wireless network interface controller, a modem, network bridge, network hub, network switch, a multilayer switch, a gateway, a bridge router, a multiplexor, a repeater, a firewall, a proxy server; or any combination thereof.

Examples of computing device 150 may include any combination of a mobile computing device, a laptop, a desktop, a server, a media set top box, or any combination thereof. Examples of server 110 may include at least one of a cloud application server, a remote cloud storage server, a data server, a cloud server, a server associated with an automation service provider, proxy server, mail server, web server, application server, database server, communications server, file server, home server, mobile server, name server, or any combination thereof.

In some configurations, the device 105 may include a user interface 135, application 140, and overlay phishing module 145. Although the components of the device 105 are depicted as being internal to the device 105, it is understood that one or more of the components may be external to the device 105 and connect to device 105 through wired and/or wireless connections. In some embodiments, application 140 may be installed on computing device 150 in order to allow a user to interface with a function of device 105, overlay phishing module 145, and/or server 110. In some cases, application 140 may include a software application such as an online application accessed via a web browser, a cloud based application, a web based application, a mobile application configured to access the Internet, a desktop application configured to access the Internet, or any combination thereof. In some cases, application 140 may be installed on an external device (not shown) connected to the device 150, and may allow a user to interface with a function of device 105, overlay phishing module 145, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LIE, for example), etc. In some configurations, the network 115 may include the Internet. It is noted that in some embodiments, the device 105 may not include an overlay phishing module 145. For example, device 105 may include application 140 that allows device 105 to interface with an external machine via overlay phishing module 145 located on another device such as computing device 150 and/or server 110. In some embodiments, device 105, and server 110 may include an overlay phishing module 145 where at least a portion of the functions of overlay phishing module 145 are performed separately and/or concurrently on device 105, and/or server 110. Likewise, in some embodiments, a user may access the functions of device 105 (directly or through device 105 via overlay phishing module 145) from computing device 150. For example, in some embodiments, computing device 150 includes a mobile application that interfaces with one or more functions of device 105, overlay phishing module 145, and/or server 110.

In some embodiments, server 110 may be coupled to database 120. Database 120 may be internal or external to the server 110. In one example, device 105 may be coupled directly to database 120, database 120 being internal or external to device 105. Database 120 may include application data 160. For example, server 110 may identify conjunction with device 105, a schematic representation of a page associated with a particular application. In some examples, server 110 may identify conjunction with device 105, at least one author associated with an application. Upon identifying the schematic representation and the at least one author, server 110 may store the schematic representation and the at least one author in the application data 160.

Overlay phishing module 145 may enable a computing device to detect a first application displaying a page of the first application on a display of the computing device, detect a second application displaying a page of the second application on the display of the computing device, upon detecting the second application displaying the page of the second application, compare a schematic representation of the page of the first application to a schematic representation of the page of the second application, and determine whether an overlay phishing attempt occurs based on the comparing. In some embodiments, overlay phishing module 145 may be configured to perform the systems and methods described herein in conjunction with user interface 135 and application 140. User interface 135 may enable a user to interact with, control, and/or program one or more functions of overlay phishing module 145. Further details regarding the overlay phishing module 145 are discussed below.

Figure 2:
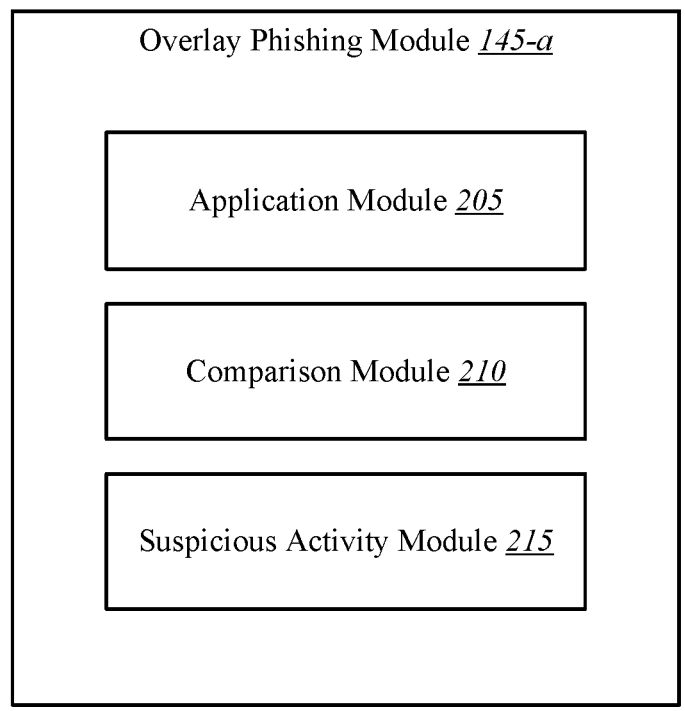
FIG. 2 is a block diagram illustrating one example of an overlay phishing module.

FIG. 2 is a block diagram illustrating one example of an overlay phishing module 145-*a*. Overlay phishing module 145-*a* may be one example of overlay phishing module 145 depicted in FIG. 1. As depicted, overlay phishing module 145-*a* may include application module 205, comparison module 210, and suspicious activity module 215.

In some embodiments, at least a portion of overlay phishing module 145 may be implemented in an application on a local machine (e.g., device 105 of FIG. 1), a remote computing device (e.g., computing device 150 of FIG. 1), a network device (e.g., network 115 of FIG. 1), a server (e.g., server 110 of FIG. 1), or any combination thereof.

In one embodiment, application module 205 may be configured to a detect first application displaying a page of the first application on a display of a computing device. In some examples, application module 205 may monitor the applications accessed by a user on a computing device. In some examples, application module 205 may monitor a browser of a computing device to identify the websites visited by the user. As one example, application module 205 may monitor application pages requested by a user. In some examples, the user may select an application icon on a computing device, and upon receiving the selection, an operating system (not shown) may fetch the application and display the application to the user. In some examples, the operating system may be included in device 105 as described with reference to FIG. 1. In one embodiment, application module 205 may be configured to detect a second application displaying a page of the second application on the display of the computing device. In some examples, application module 205 may be configured to monitor a plurality of applications being accessed on a computing device.

In some embodiments, application module 205 may be configured to determine a first schematic representation of the first application and a second schematic representation of the second application. As one example, upon determining that a first application is displaying a page on a display of a computing device, application module 205 may create a schematic representation of the first application. Application module 205 may determine a number of buttons, a number of text fields, a number of labels, and a number of icons in the presently displayed page of the first application. In one example, application module 205 may generate a wireframe representation of the presently displayed page of the first application and may save the generated wireframe representation in database 120 as discussed with reference to FIG. 1.

In some embodiments, application module 205 may be configured to measure a time between the first application initially displaying the page of the first application on the display and a second application displaying the page of the second application over the first application. For example, application module 205 may determine a first timestamp associated with a displayed page of the first application and second timestamp associated with a displayed page of the second application. In one example, application module 205 may compare the first timestamp and the second timestamp to measure the time between the first application displaying a first page and a second application displaying a second page. In some cases, application module 205 may determine whether the measured time satisfies a predetermined time threshold. In some examples, the predetermined time threshold is based on a type of application. In some examples, application module 205 may determine a type of application displaying a page, and may retrieve a predetermined time threshold associated with the application from database 120.

In some examples, application module 205 may determine that a first application is pushed to background and a second application is fetched to foreground. For example, application module 205 may determine that a first application is displaying a page on a display of a computing device. Application module 205 may then determine that the first application is pushed to background and a second application is fetched to foreground within a predetermined time threshold. In such cases, application module 205 may generate a schematic representation of the first application upon detecting that the first application is displaying a page, and application module 205 may determine a schematic representation of the second application upon determining that the second application is fetched to foreground and displaying a page of the second application.

In some examples, application module 205 may determine a sensitivity level associated with the displayed page of the first application. For example, application module 205 may determine that a first application is displaying a page on a display of a computing device and application module 205 may then determine a sensitivity level associated with the first application. In some cases, the sensitivity level may determine whether the application includes sensitive information. For example, a. banking application may possess a higher sensitivity level than a gaming application. In some cases, application module 205 may determine a sensitivity level associated with the page displayed by the first application. In some cases, a sensitivity level associated with a first page of an application may be higher than the sensitivity level associated with a second page of the application. As an example, in an online shopping application, a page for entering user information (such as, user name, user address, credit card information) may have a higher sensitivity level than a page displaying articles for sale. In some cases, application module 205 may determine that the sensitivity level associated with an application satisfies a predetermined threshold: in such cases, application module 205 may generate a schematic representation of the application upon detecting that the sensitivity satisfies the predetermined threshold.

In some cases, the schematic representation of the page of the first application is a first wireframe of the page of the first application and the schematic representation of the page of the second application is a second wireframe of the page of the second application. In some examples, the first wireframe or the second wireframe, or both, includes at least one of: a number of buttons, a location of at least one button on the page of the first application and/or the second application, a number of text fields, a location of at least one text field on the page of the first application and/or the page of the second application, a number of labels, a location of at least one label on the page of the first application and/or the page of the second application, a number of icons, a location of at least one icon on the page of the first application and/or the page of the second application, or any combination thereof.

In some examples, upon determining that a time between the first application initially displaying the page of the first application on the display and the second application displaying the page of the second application over the first application satisfies a predetermined time threshold, application module 205 may retrieve one or more details associated with the first application and the second application. In some other examples, upon determining that a first application is pushed to background and a second application is fetched to foreground, application module 205 may retrieve one or more details associated with the first application and the second application. In some examples, the one or more details may include at least an author associated with the first application and an author associated with the second application. In one example, application module 205 may determine a schematic representation of the first application and a schematic representation of the second application prior to retrieving the one or more details. In some examples, application module 205 may send the schematic representations and the retrieved details to comparison module 210.

In some embodiments, comparison module 210 may be configured to receive a first schematic representation associated with a first page displayed by a application. In some examples, comparison module 210 may receive the first schematic representation from application module 205. In some examples, comparison module 210 may be configured to retrieve the first schematic representation stored in database 120, as described with reference to FIG. 1. In some embodiments, comparison module 210 may be configured to receive a second schematic representation associated with a page displayed by a second application. In some examples, comparison module 210 may receive the second schematic representation from application module 205.

In some examples, comparison module 210 may receive an indication from application module 205 indicating that a second application is displaying a page of the second application within a predetermined time threshold of a first application displaying a page of the first application. In some examples, comparison module 210 may receive an indication from application module 205 indicating that a first application is pushed to background and a second application is brought to foreground. In some cases, upon detecting the second application displaying the page of the second application, comparison module 210 may be configured to compare a schematic representation of the page of the first application to a schematic representation of the page of the second application.

In some examples, comparison module 210 may receive the details associated with a first application and a second application. In some cases, the details may include at least an author associated with the first application and at least an author associated with the second application. In some examples, application module 205 may retrieve the details associated with the first application and upon determining the author associated with the first application, application module 205 may be configured to indicate the author associated with the first application, to comparison module 210. In some embodiments, comparison module 210 may be configured to compare the author of the first application to the author of the second application. For example, comparison module 210 may be configured to determine whether the author associated with the first application is same as the author associated with the second application value, based on the comparison. In one example, if a schematic representation of a page displayed by a first application matches with a schematic representation of a page displayed by a. second application, and the author of the first application does not match with the author of the second application, then comparison module 210 may be configured to detect a suspicious activity. In some cases, the suspicious activity may be an overlay phishing attempt.

In one embodiment, suspicious activity module 215 may be configured to detect suspicious activity based on the comparison. In some cases, suspicious activity module 215 may be configured to determine whether an overlay phishing attempt occurs based on the comparing. In some examples, suspicious activity module 215 may detect the overlay phishing attempt by the second application based on determining that the schematic representation of the page of the first application and the schematic representation of the page of the second application match, and the author of the first application does not match the author of the second application.

In some examples, suspicious activity module 215 may be configured to permit the second application to continue to display the page of the second application upon determining the schematic representation of the page of the first application does not match the schematic representation of the page of the second application. In some examples, suspicious activity module 215 may be configured to permit the second application to continue to display the page of the second application upon determining the author of the first application does match the author of the second application. In some examples, suspicious activity module 215 may be configured to permit the second application to continue to display the page of the second application upon determining the schematic representation of the page of the first application does not match the schematic representation of the page of the second application and the author of the first application matches the author of the second application.

In some examples, suspicious activity module 215 may receive an indication of a time between the first application initially displaying a page and the second application displaying a page over the first application. Suspicious activity module 215 may also receive an indication of whether the time satisfies a predetermined threshold. In one example, if the time satisfies the predetermined threshold, suspicious activity module 215 may detect the overlay phishing attempt based on determining the time satisfies the predetermined time threshold. In some examples, suspicious activity module 215 may be configured to permit the second application to continue to display the page of the second application upon determining the measured time fails to satisfy the predetermined time threshold.

In some examples, suspicious activity module 215 may receive an indication that a first application displays a page and a second application displays another page over the first application. Suspicious activity module 215 may further be configured to receive an indication of a sensitivity level associated with the first application. For example, suspicious activity module 215 may receive an indication that the first application has a sensitivity level satisfying a threshold value. Additionally or alternatively, suspicious activity module 215 may receive schematic representations of the page displayed by the first application and a schematic representation of the page displayed by the second application. In some examples, suspicious activity module 215 may detect the overlay phishing attempt by the second application based on determining that the schematic representation of the page of the first application and the schematic representation of the page of the second application match, and the sensitivity level satisfying the predetermined threshold.

In some examples, suspicious activity module 215 may identify one or more applications as being prone to overlay phishing attempt. For example, suspicious activity module 215 may identify an application associated with previous instances of overlay phishing attempts, in some examples, suspicious activity module 215 may detect a suspicious activity upon identifying a second application displaying a page over a page of a phishing-prone application. Additionally, or alternatively, suspicious activity module 215 may be configured to determine a pattern associated with one or more applications. In some examples, suspicious activity module 215 may perform a security action based on detecting the overlay phishing attempt by the second application.

In some embodiments, suspicious activity module 215 may be configured to generate a rating associated with an identified application. Upon detecting suspicious activity associated with an application, suspicious activity module 215 may tag the application, as being prone to overlay phishing. In some examples, suspicious activity module 215 may adjust a rating associated with the application based on detecting the overlay phishing attempt. In some examples, suspicious activity module 215 may be configured to terminate the first application as well as the second application based at least in part on detecting an overlay phishing attempt by the second application.

Figure 3:
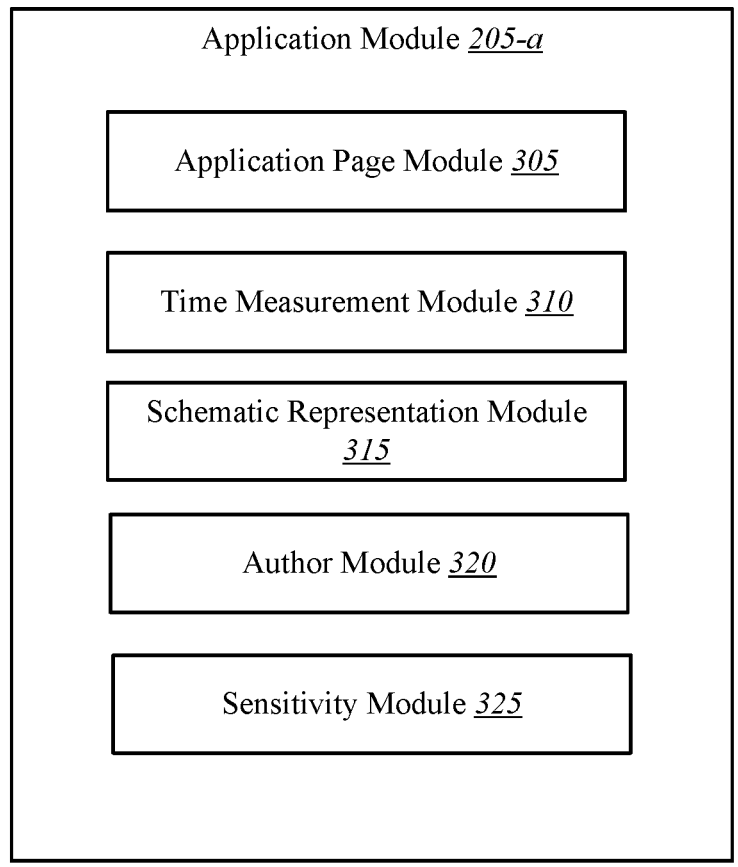
FIG. 3 is a block diagram illustrating one example of an application module.

FIG. 3 is a block diagram illustrating one example of an application module 205-*a*. The application module 205-*a* may be an example of application module 205 from FIG. 2. As depicted, application module 205-*a* may include application page module 305, time measurement module 310, schematic representation module 315, author module 320, and sensitivity module 325.

In some embodiments, at least a portion of application module 205-*a* may be implemented in an application on a local machine (e.g., device 105 of FIG. 1), a remote computing device (e.g., computing device 150 of FIG. 1), a network device (e.g., network 115 of FIG. 1), a server (e.g., server 110 of FIG. 1), or any combination thereof.

In one embodiment, application page module 305 may be configured to monitor one or more applications running on a device. For example, application page module 305 may be configured to a detect an application displaying a page on a display of a computing device. In one example, application page module 305 may monitor the pages displayed by an application in real time. In some examples, application page module 305 may monitor the applications accessed by a user on a computing device. For example, application page module 305 may be configured to detect one or more tasks running on an operating system. Application page module 305 may further determine that a user has selected to access a particular application while another application is running on the background. More specifically, application page module 305 may determine one or more currents tasks running on an operating system of a computing device. The computing device may be a device 105 or a computing device 150, as described with reference to FIG. 1.

Additionally or alternatively, application page module 305 may monitor when an application is launched in a computing device associated with a user. In some cases, the application may be launched in a mobile device, a desktop, a laptop, a tablet, a smartwatch, or in any such computing device. In some examples, application page module 305 may be configured to detect that a first application is displaying a page of the first application on a display of the computing device.

In some examples, application page module 305 may monitor a browser of a computing device to identify one or more websites visited by the user. In some cases, application page module 305 may determine whether a website visited by a. user accesses an application stored on the computing device. As one example, application page module 305 may determine that a user is accessing a website of his financial institution from his computing device. The website may in turn access an application associated with the financial institution, stored in the computing device. Upon determining that the financial institution website is accessing the application of the financial institution, application page module 305 may in turn detect that the application of the financial institution is displaying a page on the computing device.

In some embodiments, application page module 305 may monitor application pages accessed by a user. For example, the user may select an application icon on a computing device, and upon receiving the selection, an operating system (not shown) may fetch the application and display a page of the application to the user. In some examples, the operating system may be included in device 105 or computing device 150, as described with reference to FIG. 1. In some examples, application page module 305 may be configured to detect a second application displaying a page of the second application on the display of the computing device. In some examples, application page module 305 may be configured to monitor a plurality of applications being accessed on a computing device.

In some examples, application page module 305 may be configured to determining that the first application is pushed to background and the second application is fetched to foreground. For example, application page module 305 may be configured to monitor multiple applications and the pages displayed by the applications. In some examples, application page module 305 may determine that a first application is displaying a page on a display of a computing device. Application page module 305 may then determine that the first application is pushed to background and a second application is fetched to foreground. In some cases, the second application is fetched to foreground within a predetermined time threshold after the first application is pushed to background. In some cases, the application page module 305 may receive an indication of the predetermined time threshold from time measurement module 310.

In such cases, application page module 305 may generate a schematic representation of the first application upon detecting that the first application is displaying a page, and application page module 305 may determine a schematic representation of the second application upon determining that the second application is fetched to foreground and displaying a page of the second application.

In some embodiments, time measurement module 310 may receive an indication of a first application displaying a page. In some cases, the indication may be received from application page module 305. Upon determining the first application displaying the page of the first application, in some examples, time measurement module 310 may determine a first timestamp associated with a displayed page of the first application. For example, time measurement module 310 may determine a time when the first application began displaying the page.

In some embodiments, time measurement module 310 may be configured to receive an indication of a second application displaying a page of the second application. The second application may be different from the first application. In some cases, the indication of the second application displaying a page of the second application may be received from application page module 305. Upon determining that the second application is displaying the page of the second application, in some examples, time measurement module 310 may determine a second timestamp associated with a displayed page of the second application. As an example, time measurement module 310 may determine a time when the second application initiated a display of the page. In some embodiments, time measurement module 310 may be configured to measure a time between the first application initially displaying the page of the first application on a display of a computing device and the second application displaying the page of the second application over the first application. In some cases, the second application may display on top of the first application on the display of the computing devices. In some embodiments, time measurement module 310 may be configured to measure a different between the first timestamp associated with a displayed page of the first application and the second timestamp associated with a displayed page of the second application. In one example, time measurement module 310 may compare the first timestamp and the second timestamp to measure the time between the first application displaying a first page and a second application displaying a second page. In some cases, time measurement module 310 may determine whether the measured time satisfies a predetermined time threshold. in some examples, time measurement module 310 may determine the predetermined threshold based on a type of the applications. In some cases, the predetermined time threshold may be based on a sensitivity level associated with the first application. In some cases, the predetermined time threshold may be based on a sensitivity level associated with both the first application and the second application. In some examples, time measurement module 310 may determine a type of application displaying a page, and may retrieve a predetermined time threshold associated with the application from database 120. In some examples, time measurement module 310 may send the determined time threshold back to application page module 305. In some examples, time measurement module 310 may send the determined time threshold to schematic representation module 315 and author module 320.

In some examples, time measurement module 310 may receive an indication that a first application is pushed to background and a second application is fetched to foreground. In some cases, time measurement module 310 may receive the indication from application page module 305. For example, application page module 305 may first determine that a first application is displaying a page on a display of a computing device, and may then indicate to time measurement module 310 that the first application is displaying the page on the display. Upon receiving the indication, time measurement module 310 may determine whether the first application is pushed to background and a second application is fetched to foreground within a predetermined time threshold. In some cases, time measurement module 310 may compare a first timestamp associated with the first application with a second timestamp associated with the second application to determine whether the second application is fetched to foreground within a predetermined time threshold. In such cases, time measurement module 310 may notify the schematic representation module 315 if the second application is fetched to foreground within a threshold time.

In some embodiments, schematic representation module 315 may generate a schematic representation of a first application upon detecting that the first application is displaying a page. In some examples, schematic representation module 315 may receive an indication from application page module 305 indicating that a first application is displaying a page on a display of a computing device. In some cases, upon receiving the indication, schematic representation module 315 may generate a schematic representation of the page displayed by the first application. For example, the schematic representation of the page of the first application may be a first wireframe of the page of the first application. In some cases, the first wireframe includes at least one of: a number of buttons, a location of at least one button on the page of the first application, a number of text fields, a location of at least one text field on the page of the first application, a number of labels, a location of at least one label on the page of the first application, a number of icons, a location of at least one icon on the page of the first application, or any combination thereof. In some examples, schematic representation module 315 may determine the schematic representation of the page of the first application and may send the schematic representation to application data 160 in database 120, as described with reference to FIG. 1. In some examples, schematic representation module 315 may send the generated wireframe of the page of the first application to comparison module 210, as described with reference to FIG. 2.

In some embodiments, schematic representation module 315 may generate a schematic representation of a second application upon detecting that the first application is displaying a page over a page displayed by a first application. In some examples, schematic representation module 315 may receive an indication from application page module 305 indicating that a second application is displaying a page on a display of a computing device. Schematic representation module 315 may further receive an indication that the page associated with the second application is displayed within a threshold time after display of the page associated with the first application. In such cases, schematic representation module 315 may receive an indication of the threshold time from time measurement module 310. In some cases, schematic representation module 315 may receive an indication that a page displayed by the second application is fetched to foreground within a threshold time period after the first application is pushed to background. In some cases, upon receiving the indication, schematic representation module 315 may generate a schematic representation of the page displayed by the second application. For example, the schematic representation of the page of the second application may be a second wireframe of the page of the second application.

In some cases, the second wireframe includes at least one of: a number of buttons, a location of at least one button on the page of the second application, a number of text fields, a location of at least one text field on the page of the second application, a number of labels, a location of at least one label on the page of the second application, a number of icons, a location of at least one icon on the page of the second application, or any combination thereof. In some examples, schematic representation module 315 may determine the schematic representation of the page of the second application and may send the schematic representation to application data 160 in database 120, as described with reference to FIG. 1. In some examples, schematic representation module 315 may send the generated wireframe of the page of the second application to comparison module 210, as described with reference to FIG. 2. In some further examples, schematic representation module 315 may be configured to send the first wireframe associated with the page displayed by the first application and the second wireframe associated with the page displayed by the second application to suspicious activity module 215, as described with reference to FIG. 2.

In some embodiments, author module 320 may retrieve one or more details associated with a page displayed by a first application. In some cases, the one or more details may include at least an author associated with the first application. In some examples, author module 320 may receive an indication from application page module 305 and/or schematic representation module 315 indicating that a first application is displaying a page on a display of a computing device. In some cases, upon receiving the indication, author module 320 may retrieve one or more details associated with the first application In some cases, the one or more details may be retrieved from application data 160 stored in database 120, as described with reference to FIG. 1. In some examples, author module 320 may be configured to determine any other unique identifier associated with the first application.

In some embodiments, author module 320 may retrieve one or more details associated with a page displayed by a second application. In some cases, the one or more details may include at least an author associated with the second application. In some examples, author module 320 may receive an indication from application page module 305 and/or schematic representation module 315 indicating that the second application is displaying a page on a display of a computing device. In some cases, author module 320 may receive an indication that the page associated with the second application is displayed within a threshold time after display of the page associated with the first application. In some examples, author module 320 may receive an indication of the threshold time from time measurement module 310 and/or schematic representation module 315. In some examples, author module 320 may receive an indication that a. page displayed by the second application is fetched to foreground within a threshold time period after the first application is pushed to background. In some cases, upon receiving the indication, author module 320 may retrieve one or more details associated with the second application. In some cases, the one or more details may be retrieved from application data 160 stored in database 120, as described with reference to FIG. 1. In some examples, author module 320 may be configured to determine any other unique identifier associated with the second application.

In some embodiments, sensitivity module 325 may determine a sensitivity level associated with the displayed page of the first application. In some cases, sensitivity module 325 may receive an indication that a first application is displaying a page on a display of a computing device and sensitivity module 325 may then determine a sensitivity level associated with the first application. In some cases, the sensitivity level may determine whether the application includes sensitive information associated with a user. For example, a banking application may possess a higher sensitivity level than a gaming application. In some cases, sensitivity module 325 may determine a sensitivity level associated with the page displayed by the first application. In some examples, sensitivity module 325 may determine a sensitivity level associated with each page displayed by the first application. In some cases, a sensitivity level associated with a first page of an application may be higher than the sensitivity level associated with a second page of the application. As an example, in an online shopping application, a page for entering user information (such as, user name, user address, credit card information) may have a higher sensitivity level than a page displaying articles for sale. In some embodiments, sensitivity module 325 may determine whether the sensitivity level associated with an application satisfies a predetermined threshold. In some cases, the threshold may be retrieved from application data 160 in database 120, as described with reference to FIG. 1. In some examples, sensitivity module 325 may send the sensitivity level to schematic representation module 315. In such cases, schematic representation module 315 may generate a schematic representation of the first application upon detecting that the sensitivity level associated with the first application satisfies the predetermined threshold.

Figure 4:
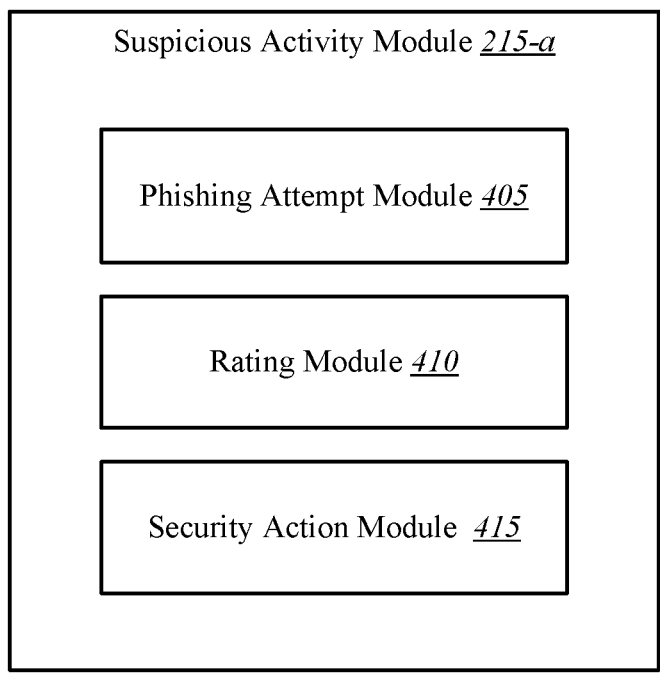
FIG. 4 is a block diagram illustrating one example of a suspicious activity module.

FIG. 4 is a block diagram illustrating one example of a suspicious activity module 215-*a*. The suspicious activity module 215-*a* may be an example of suspicious activity module 215 from FIG. 2. As depicted, suspicious activity module 215-*a* may include phishing attempt module 405, rating module 410, and security action module 415.

In some embodiments, at least a portion of suspicious activity module 215-*a* may be implemented in an application on a local machine (e.g., device 105 of FIG. 1), a remote computing device (e.g., computing device 150 of FIG. 1), a network device (e.g., network 115 of FIG. 1), a server (e.g., server 110 of FIG. 1), or any combination thereof.

In one embodiment, phishing attempt module 405 may be configured to detect suspicious activity based on comparing a first schematic representation of a page displayed by a first application to a second schematic representation of a page displayed by a second application and a first author to a second author. In some cases, phishing attempt module 405 may be configured to detect whether an overlay phishing attempt occurs based on the comparing. For example, if phishing attempt module 405 determines that the schematic representation of the page of the first application and the schematic representation of the page of the second application match, and the author of the first application does not match the author of the second application, then phishing attempt module 405 may determine that the second application is attempting an overlay phishing attempt on the first application. Upon detecting a suspicious activity, phishing attempt module 405 may notify security action module 415 of the determined suspicious activity. For instance, phishing attempt module 405 may indicate that the second application is attempting an overlay phishing on the first application.

In some examples, phishing attempt module 405 may identify a name of an application associated with the suspicious activity (such as, overlay phishing attempt). For example, phishing attempt module 405 may determine a host of an application and other details associated with the application. Phishing attempt module 405 may monitor an established connection between a device and a website associated with the application. For example, if the suspicious activity is related to an application of a financial institution, then phishing attempt module 405 may also monitor a connection established between the computing device and the website associated to the same financial institution.

In some examples, phishing attempt module 405 may be configured to receive an indication of a time between the first application initially displaying a page and the second application displaying another page over the first application. For example, phishing attempt module 405 may receive the indication of time from application module 205-*a*, as described with reference to FIG. 3. In some cases, phishing attempt module 405 may receive an indication of whether the time satisfies a predetermined threshold. If the time satisfies the predetermined threshold, phishing attempt module 405 may detect the overlay phishing attempt based on receiving the indication that the time satisfies the predetermined time threshold. For example, if phishing attempt module 405 determines that a second application displays a page over a page displayed by a first application within a threshold time, then phishing attempt module 405 may determine that the second application is attempting an overlay phishing.

In some examples, phishing attempt module 405 may receive an indication that a first application displays a page and a second application displays another page over the first application. Phishing attempt module 405 may further receive an indication of a sensitivity level associated with the first application. In some examples, phishing attempt module 405 may receive an indication from application module 205-*a*, as described with reference to FIG. 3. In some cases, phishing attempt module 405 may receive the indication that the first application has a sensitivity level satisfying a threshold value. In some embodiments, phishing attempt module 405 may receive schematic representations of the page displayed by the first application and a schematic representation of the page displayed by the second application. in some examples, phishing attempt module 405 may detect the overlay phishing attempt by the second application upon determining that the schematic representations of the page of the first application and the schematic representation of the page of the second application match, and the sensitivity level satisfying the predetermined threshold. For example, phishing attempt module 405 may detect overlay phishing attempt by a second application, upon determining that the second application displays a similar page over a page of a first application, and that the first application includes sensitive information (such as, financial details of a user).

In some examples, phishing attempt module 405 may identify one or more applications as being prone to overlay phishing attempt. For example, suspicious activity module 215 may identify an application associated with previous instances of overlay phishing attempts on one or more monitored computing devices. For instance, suspicious activity module 215 may receive telemetry data from one or more remotely monitored computing devices, analyze the telemetry data, and identify one or more applications associated with previous overlay phishing attempts based at least in part on the analysis. In some cases, phishing attempt module 405 may determine that an application associated with a financial institution is more prone to overlay phishing attempt than an application associated with a social network. In some examples, phishing attempt module 405 may identify one or more pages within an application as being more prone to overlay phishing than one or more other pages of the same application.

In some embodiments, rating module 410 may be configured to generate a rating associated with an identified application. For example, rating module 410 may receive information relating to the application from phishing attempt module 405. In some examples, rating module 410 may receive an indication if suspicious activity is associated with the identified application. If suspicious activity associated with the application exists, then rating module 410 may tag the application as as being prone to overlay phishing. In some examples, rating module 410 may adjust a rating associated with the identified application. In some examples, if a rating of an application (or a website) falls below a certain threshold, then additional verification may be requested at the time of connection establishment.

In some examples, rating module 410 may send the ratings to application module 205-*a*, as described with reference to FIG. 3. Application module 205 may monitor every page of a phishing-prone application (i.e., an application with lower rating). In some examples, application module 205-*a* may only monitor the first page of safer application (i.e., application with a higher rating and lesser chance of being subjected to overlay phishing), In some embodiments, rating module 410 may tag an application as phishing-prone or safe.

In some examples security action module 415 may receive an indication (e.g., from application module 205-*a*) that a page is displayed by a second application over a page displayed by a first application. Security action module 415 may further receive an indication that the schematic representations of the pages displayed by the first and second applications are same, and the author associated with the first application is same as the author associated with the second application. Based on the received indication, security action module 415 may be configured to permit the second application to continue to display the page of the second application. Additionally or alternatively, security action module 415 may receive an indication that a page is displayed by a second application a measured time after a page is displayed by a first application. In some examples, security action module 415 may permit the second application to continue to display the page of the second application upon determining the measured time fails to satisfy the predetermined time threshold.

In some examples, security action module 415 may perform a security action based on detecting the overlay phishing attempt by the second application. In some cases, the security action may include blocking a display of the second application by pushing the second application to background and fetching a warning message to foreground. In some embodiments, security action module 415 may be configured to terminate a connection associated with the second application based on detecting an overlay phishing attempt. In some examples, security action module 415 may receive an indication of overlay phishing attempt from phishing attempt module 405. Upon receiving the indication, security action module 415 may be configured to immediately terminate the second application (i.e., terminate the connection initiated by the second application).

Figure 5:
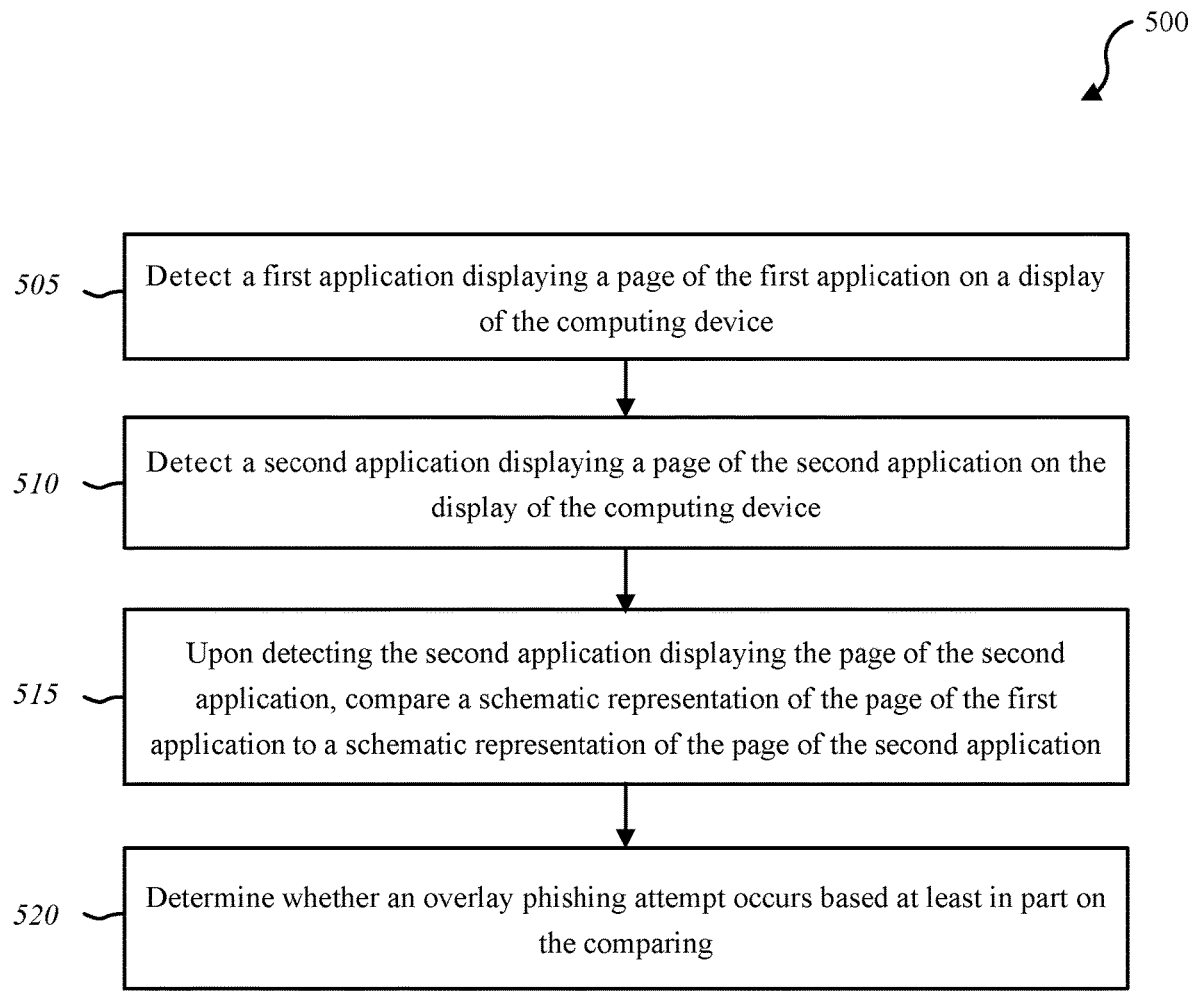
FIG. 5 is a flow diagram illustrating one embodiment of a method in accordance with various aspects of this disclosure.

FIG. 5 is a flow diagram illustrating one embodiment of a method 500 to block overlay phishing attempt. In some configurations, the method 500 may be implemented by the overlay phishing module 145 illustrated in FIGS. 1, 2, 3, and/or 4. In some configurations, the method 500 may be implemented in conjunction with device 105, server 110, network 115, database 120, components thereof, or any combination thereof.

At block 505, method 500 may include detecting a first application displaying a page of the first application on a display of the computing device. At block 510, method 500 may include detecting a second application displaying a page of the second application on the display of the computing device. At block. 515, method 500 may include upon detecting the second application displaying the page of the second application, comparing a schematic representation of the page of the first application to a schematic representation of the page of the second application. At block 520, method 500 may include determining whether an overlay phishing attempt occurs based on the comparing.

Figure 6:
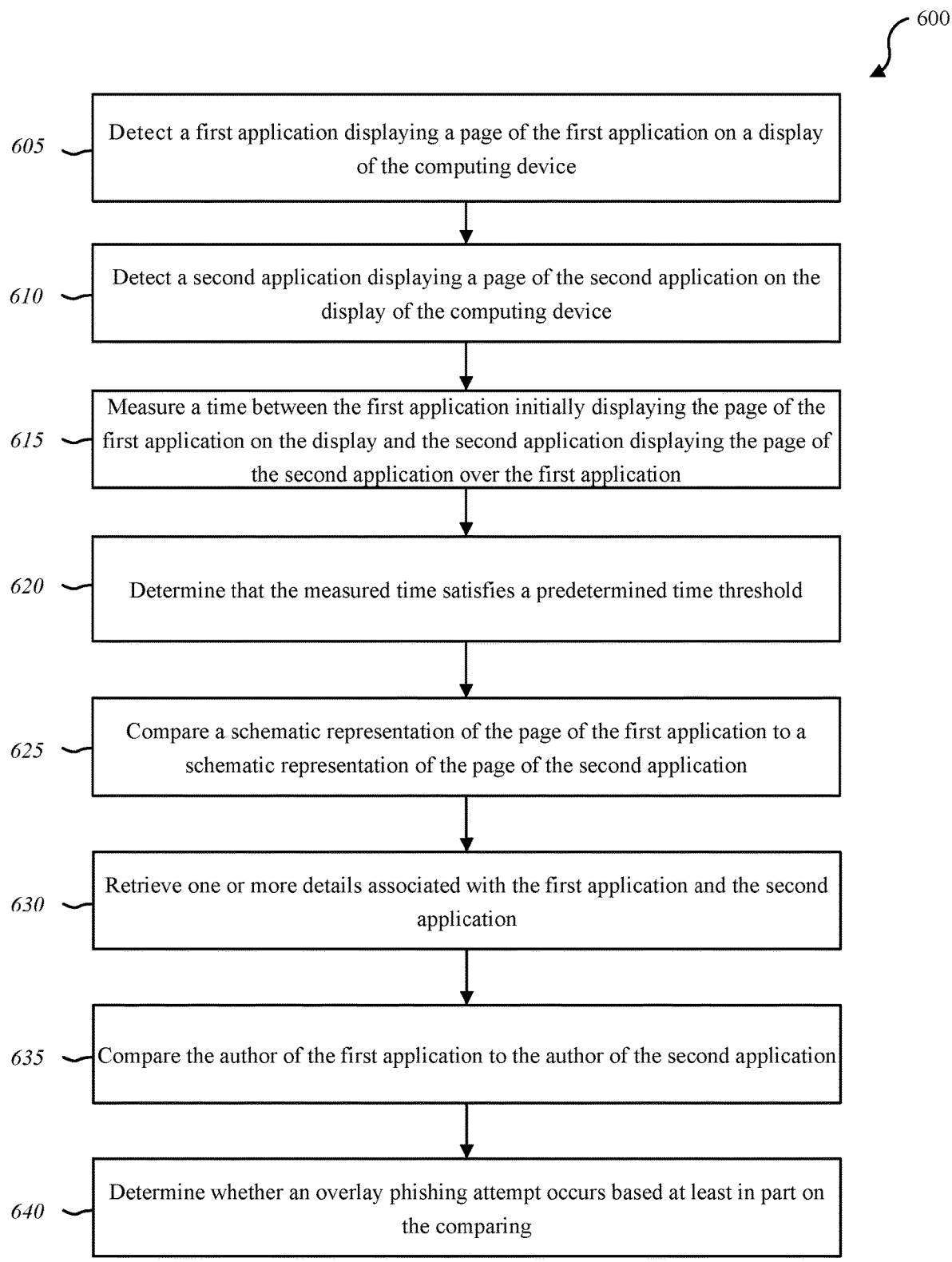
FIG. 6 is a flow diagram illustrating one embodiment of a method in accordance with various aspects of this disclosure.

FIG. 6 is a flow diagram illustrating one embodiment of a method 600 to block overlay phishing attempt. in some configurations, the method 600 may be implemented by the overlay phishing module 145 illustrated in FIGS. 1, 2, 3, and/or 4. In some configurations, the method 600 may be implemented in conjunction with device 105, server 110, network 115, database 120, components thereof, or any combination thereof.

At block 605, method 600 may include detecting a first application displaying a page of the first application on a display of the computing device. At block 610, method 600 may include detecting a second application displaying a page of the second application on the display of the computing device. At block 615, method 600 may include measuring a time between the first application initially displaying the page of the first application on the display and the second application displaying the page of the second application over the first application.

At block 620, method 600 may include determining that the measured time satisfies a predetermined time threshold. At block 625, method 600 may include comparing a schematic representation of the page of the first application to a schematic representation of the page of the second application. At block 630, method 600 may include retrieving one or more details associated with the first application and the second application. At block 635, method 600 may include comparing the author of the first application to the author of the second application. At block 640, method 600 may include determining whether an overlay phishing attempt occurs based on the comparing. For example, an overlay phishing attempt is determined if the schematic representation of the page of the first application and the schematic representation of the page of the second application match, and the author of the first application does not match the author of the second application.

Figure 7:
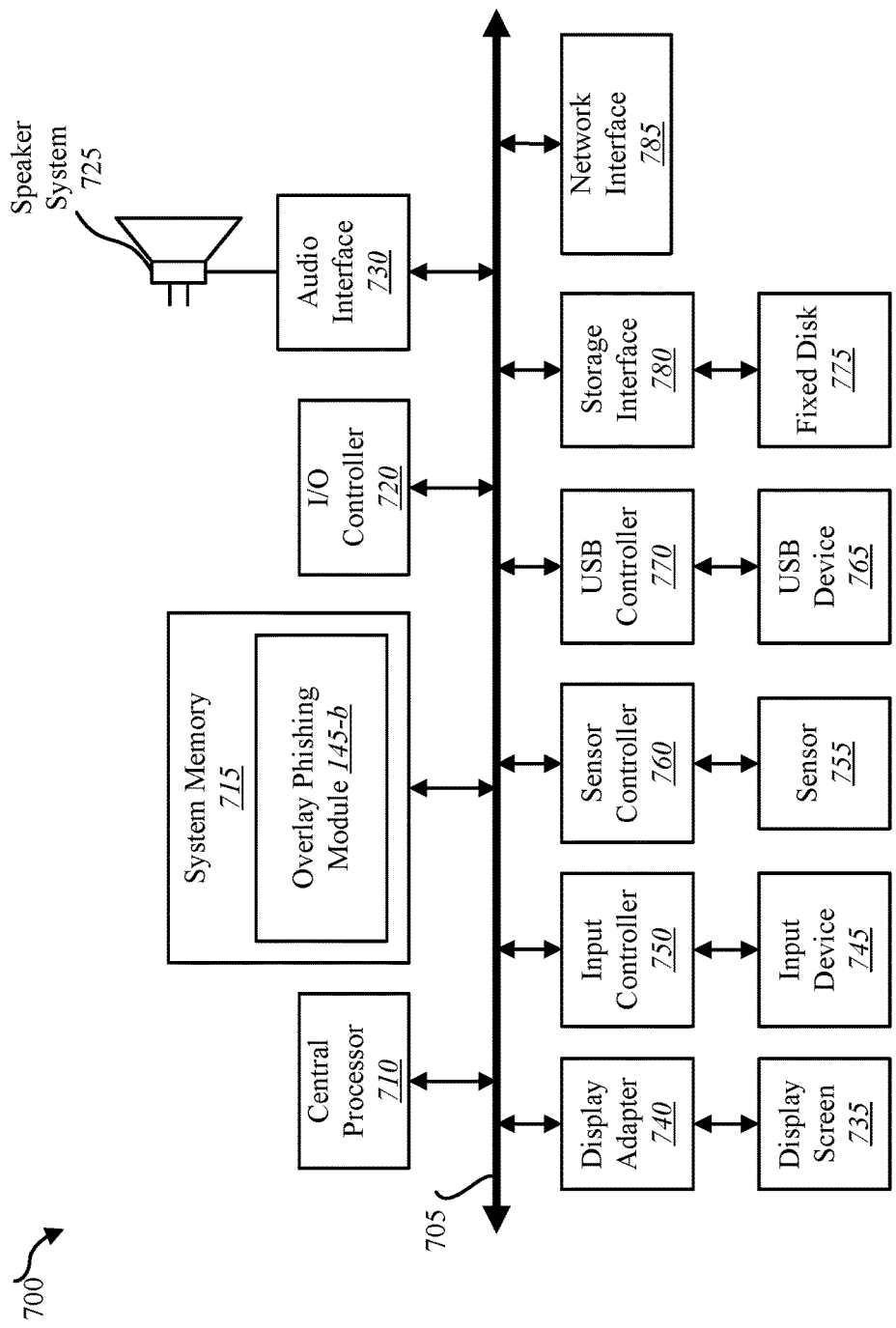
FIG. 7 depicts a block diagram of a computer system suitable for implementing the present systems and methods.

FIG. 7 depicts a block diagram of a computing device 700 suitable for implementing the present systems and methods. The device 700 may be an example of device 105, computing device 150, and/or server 110 illustrated in FIG. 1. In one configuration, device 700 includes a bus 705 which interconnects major subsystems of device 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, an input device 745 (e.g., remote control device interfaced with an input controller 750), multiple USB devices 765 (interfaced with a USB controller 770), and a storage interface 780. Also included are at least one sensor 755 connected to bus 705 through a sensor controller 760 and a network interface 785 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the overlay phishing module 145-*c* to implement the present systems and methods may be stored within the system memory 715. Applications (e.g., application 140) resident with device 700 are generally stored on and accessed via a non-transitory computer readable medium, such as a hard disk drive (e.g., fixed disk 775) or other storage medium. Additionally, applications can be in the form of electronic signals modulated in accordance with the application and data communication technology when accessed via interface 785.

Storage interface 780, as with the other storage interfaces of device 700, can connect to a standard computer readable medium for storage and/or retrieval of information, such as a fixed disk drive 775. Fixed disk drive 775 may be a part of device 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 700 wirelessly via network interface 785.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 7 need not be present to practice the present systems and methods. The devices and subsystems can be interconnected in different ways from that shown in FIG. 7. The aspect of some operations of a system such as that shown in FIG. 7 are readily known in the art and are not discussed in detail in this application. Code to implement the present disclosure can be stored in a non-transitory computer-readable medium such as one or more of system memory 715 or fixed disk 775. The operating system provided on device 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with system 700 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 785 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc The I/O controller 720 may operate in conjunction with network interface 785 and/or storage interface 780. The network interface 785 may enable system 700 with the ability to communicate with client devices (e.g., device 105 of FIG. 1), and/or other devices over the network 115 of FIG. 1. Network interface 785 may provide wired and/or wireless network connections. In some cases, network interface 785 may include an Ethernet adapter or Fiber Channel adapter. Storage interface 780 may enable system 700 to access one or more data storage devices. The one or more data storage devices may include two or more data tiers each. The storage interface 780 may include one or more of an Ethernet adapter, a Fiber Channel adapter, Fiber Channel Protocol (FCP) adapter, a SCSI adapter, and iSCSI protocol adapter.

Figure 8:
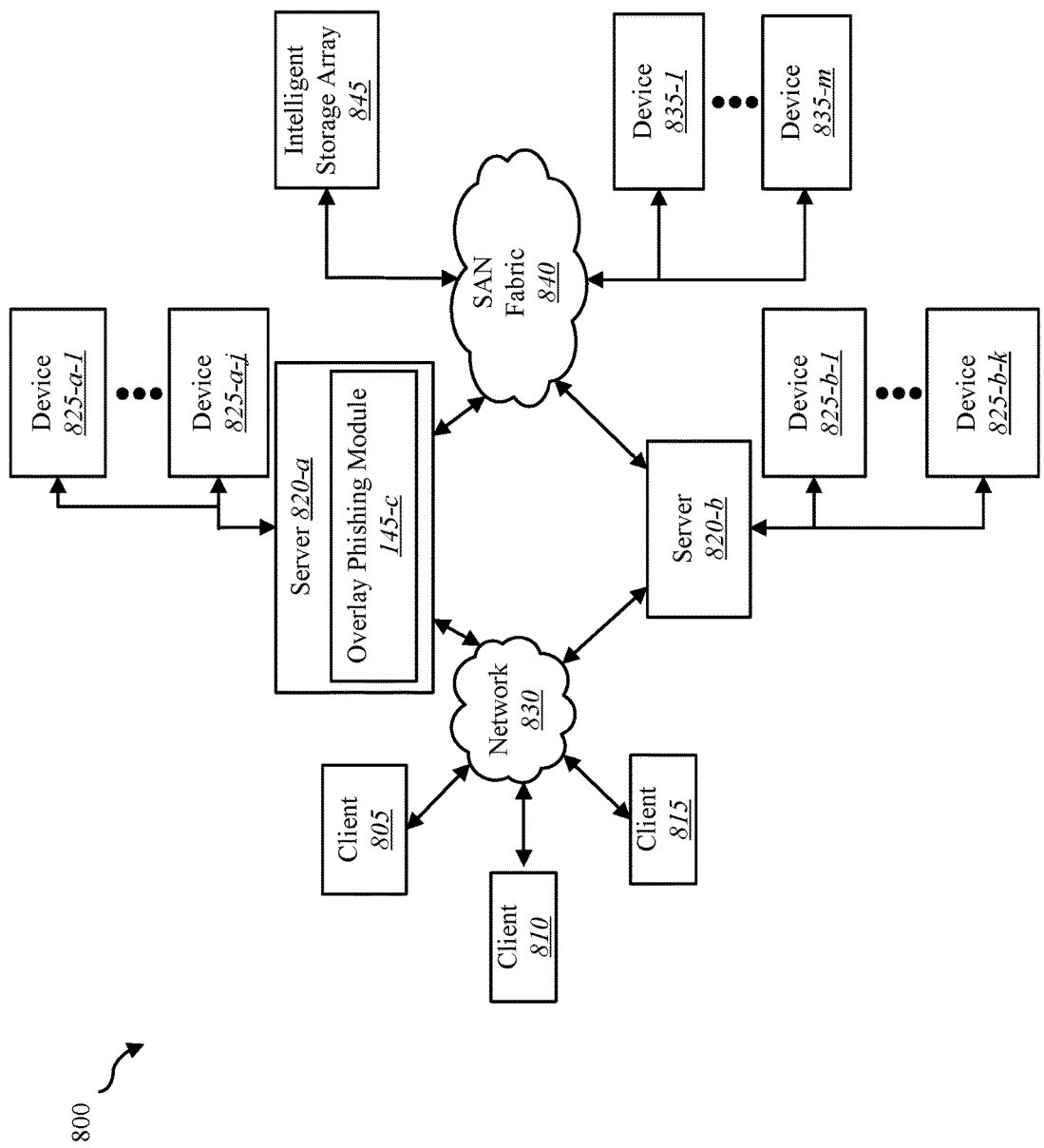
FIG. 8 depicts a block diagram of a computer system suitable for implementing the present systems and methods.

FIG. 8 is a block diagram depicting a network architecture 800 in which client systems 805, 810 and 815, as well as storage servers 820-*a* and 820-*b* (any of which can be implemented using computer system 700), are coupled to a network 830. In one embodiment, overlay phishing module 145-*d* may be located within one of the storage servers 820-*a*, 820-*b* to implement the present systems and methods. Overlay phishing module 145-*d* may be one example of overlay phishing module 145 depicted in FIGS. 1, 2, 3, 4, and/or 7. The storage server 820-*a* is further depicted as having storage devices 825-*a*-1 through 825-*a*-*j* directly attached, and storage server 820-*b* is depicted with storage devices 825-*b*-1 through 825-*b*-*k* directly attached. SAN fabric 840 supports access to storage devices 835-1 through 835-*m* by storage servers 820-*a* and 820-*b*, and so by client systems 805, 810 and 815 via network 830. Intelligent storage array 845 is also shown as an example of a specific storage device accessible via. SAN fabric 840.

With reference to computer system 700, network interface 785 or some other method can be used to provide connectivity from each of client computer systems 805, 810 and 815 to network 830. Client systems 805, 810 and 815 are able to access information on storage server 820-*a* or 820-*b* using, for example, a web browser or other client software (not shown). Such a client allows client systems 805, 810 and 815 to access data hosted by storage server 820-*a* or 820-*b* or one of storage devices 825-*a*-1 to 825-*a*-*j*, 825-*b*-1 to 825-*b*-*k*, 835-1 to 835-*m* or intelligent storage array 845. FIG. 8 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on"

as used in the specification and the claims is to be construed as meaning "based at least upon."

As used herein, the term "security action" may refer to any number of actions the systems described herein may take after detecting an overlay phishing attempt. For example, types of security actions may include preventing a suspicious application from performing any actions on the computing device, alerting an administrator to the potential maliciousness of the application, quarantine a file related to the connection, delete the file, block a download of the file, and/or warn a user about the application. In addition, the systems described herein may perform a security action on objects other than a file. For example, the systems described herein may blacklist malicious URLs and/or Internet Protocol (IP) addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A computer-implemented method to block overlay phishing, at least a portion of the method being performed by a computing device comprising one or more processors, the method comprising:
    detecting, via the computing device, a first application displaying a first page of the first application on a display of the computing device;
    detecting, via the computing device, a second application displaying a second page of the second application on the display of the computing device;
    upon detecting the second application displaying the second page of the second application, comparing, via the computing device, a first schematic representation of the first page of the first application to a second schematic representation of the second page of the second application, the first schematic representation of the first page of the first application being a first wireframe of the first page of the first application and the second schematic representation of the second page of the second application being a second wireframe of the second page of the second application; and
    determining, via the computing device, whether an overlay phishing attempt occurs based at least in part on the comparing.

2. The method of claim 1, further comprising:
    retrieving at least a first author associated with the first application and a second author associated with the second application; and
    comparing the first author of the first application to the second author of the second application.

3. The method of claim 2, further comprising detecting the overlay phishing attempt by the second application based at least in part on:
    determining that the first schematic representation of the first page of the first application and the second schematic representation of the second page of the second application match; and
    determining that the first author of the first application does not match the second author of the second application.

4. The method of claim 2, further comprising permitting the second application to continue displaying the second page of the second application:
    upon determining the first schematic representation of the first page of the first application does not match the second schematic representation of the second page of the second application; and/or
    upon determining the first author of the first application does match the second author of the second application.

5. The method of claim 1, further comprising:
    measuring a time between the first application initially displaying the first page of the first application on the display and the second application displaying the second page of the second application over the first page; and
    determining whether the measured time satisfies a predetermined time threshold.

6. The method of claim 5, further comprising:
    detecting the overlay phishing attempt based at least in part on determining the measured time satisfies the predetermined time threshold; or
    permitting the second application to continue displaying the second page of the second application upon determining the measured time fails to satisfy the predetermined time threshold.

7. The method of claim 1, further comprising:
    determining that the first application is pushed to background; and
    determining that the second application is fetched to foreground within a predetermined time threshold after the first application is pushed to background.

8. The method of claim 1, wherein the first wireframe or the second wireframe, or both, comprises at least one of: a number of buttons, a location of at least one button on the first page of the first application and/or the second page of the second application, a number of text fields, a location of at least one text field on the first page of the first application and/or the second page of the second application, a number of labels, a location of at least one label on the first page of the first application and/or the second page of the second application, a number of icons, a location of at least one icon on the first page of the first application and/or the second page of the second application, or any combination thereof.

9. The method of claim 1, further comprising:
    determining a sensitivity level associated with the first page of the first application;
    determining that the sensitivity level satisfies a predetermined threshold; and
    detecting the overlay phishing attempt by the second application based at least in part on:
        determining that the first schematic representation of the first page of the first application and the second schematic representation of the second page of the second application match; and
        the sensitivity level satisfying the predetermined threshold.

10. The method of claim 1, further comprising performing a security action based at least in part on detecting the overlay phishing attempt by the second application.

11. The method of claim 10, wherein performing the security action further comprises:
    blocking the displaying of the second application by pushing the second application to background and fetching a warning message to foreground.

12. A computer-implemented method to block overlay phishing, at least a portion of the method being performed by a computing device comprising one or more processors the method comprising:
- detecting a first application displaying a first page of the first application on a display of the computing device;
- detecting a second application displaying a second page of the second application on the display of the computing device;
- upon detecting the second application displaying the second page of the second application;
  - comparing a first schematic representation of the first page of the first application to a second schematic representation of the second page of the second application, and
  - measuring a time between the first application initially displaying the first page of the first application on the display and the second application displaying the second page of the second application over the first page; and
- determining whether an overlay phishing attempt occurs based at least in part on:
  - the comparing, and
  - whether the measured time satisfies a predetermined time threshold.

13. The method of claim 12, further comprising:
- retrieving at least a first author associated with the first application and a second author associated with the second application; and
- comparing the first author of the first application to the second author of the second application.

14. The computing device method of claim 13, further comprising detecting the overlay phishing attempt by the second application based at least in part on determining that the first schematic representation of the first page of the first application and the second schematic representation of the second page of the second application match, and the first author of the first application does not match the second author of the second application.

15. The method of claim 12, further comprising:
- detecting the overlay phishing attempt based at least in part on determining the measured time satisfies the predetermined time threshold; or
- permitting the second application to continue displaying the second page of the second application upon determining the measured time fails to satisfy the predetermined time threshold.

16. The method of claim 12, further comprising:
- determining that the first application is pushed to background; and
- determining that the second application is fetched to foreground within the predetermined time threshold after the first application is pushed to background.

17. A computer-implemented method to block overlay phishing, at least a portion of the method being performed by a computing device comprising one or more processors, the method comprising:
- detecting a first application displaying a first page of the first application on a display of the computing device;
- detecting a second application displaying a second page of the second application on the display of the computing device;
- upon detecting the second application displaying the second page of the second application:
  - comparing a first schematic representation of the first page of the first application to a second schematic representation of the second page of the second application, and
  - determining a sensitivity level associated with the first page of the first application,
  - determining whether the sensitivity level satisfies a predetermined threshold; and
- determining that an overlay phishing attempt occurred by the second application based at least in part on:
  - determining that the first schematic representation of the first page of the first application and the second schematic representation of the second page of the second application match; and
  - determining that the sensitivity level satisfies the predetermined threshold.

18. The method of claim 17, further comprising:
- retrieving at least a first author associated with the first application and a second author associated with the second application; and
- comparing the first author of the first application to the second author of the second application.

19. The method of claim 18, further comprising detecting the overlay phishing attempt by the second application based at least in part on:
- determining that the first schematic representation of the first page of the first application and the second schematic representation of the second page of the second application match; and
- determining that the first author of the first application does not match the second author of the second application.

20. The method of claim 17, further comprising:
- measuring a time between the first application initially displaying the first page of the first application on the display and the second application displaying the second page of the second application over the first page;
- determining whether the measured time satisfies a predetermined time threshold; and
- detecting the overlay phishing attempt based at least in part on determining the measured time satisfies the predetermined time threshold.

* * * * *